(12) United States Patent
Van Vliembergen et al.

(10) Patent No.: US 12,522,004 B2
(45) Date of Patent: Jan. 13, 2026

(54) FLATBED PRINTER AND USER INTERFACE WITH PRESSURE REGULATION FOR IN A SUCTION CHAMBER OF THE FLATBED PRINTER

(71) Applicant: Canon Production Printing Holding B.V., Venlo (NL)

(72) Inventors: Eduardus J. W. Van Vliembergen, Venlo (NL); Sven Beekers, Venlo (NL); Robert H. H. Prikanowski, Venlo (NL); Violeta Iacob, Venlo (NL); Dennis L. Beaton, Venlo (NL); Peter Peuters, Venlo (NL); Hürol V. Kaşikaralar, Venlo (NL)

(73) Assignee: Canon Production Printing Holding B.V., Venlo (NL)

( * ) Notice: Subject to any disclaimer, the term of this patent is extended or adjusted under 35 U.S.C. 154(b) by 0 days.

(21) Appl. No.: 19/030,790

(22) Filed: Jan. 17, 2025

(65) Prior Publication Data

US 2025/0242608 A1 Jul. 31, 2025

(30) Foreign Application Priority Data

Jan. 29, 2024 (EP) .................... 24154513

(51) Int. Cl.
*B41J 11/00* (2006.01)
*B41J 3/28* (2006.01)
*G06F 3/04847* (2022.01)

(52) U.S. Cl.
CPC ............. *B41J 11/0085* (2013.01); *B41J 3/28* (2013.01); *G06F 3/04847* (2013.01)

(58) Field of Classification Search
CPC .......................... B41J 11/0085; G06F 3/04847
See application file for complete search history.

(56) References Cited

U.S. PATENT DOCUMENTS

| 5,995,084 A | 11/1999 | Chan et al. | |
| 6,781,684 B1 * | 8/2004 | Ekhoff | ............... H01L 21/6838 356/600 |
| 8,579,284 B2 * | 11/2013 | Herrmann | ............. B65H 9/101 271/236 |

(Continued)

FOREIGN PATENT DOCUMENTS

| JP | 2016007742 A | * | 1/2016 | ........... B41J 11/008 |
| JP | 2019043073 A | * | 3/2019 | |

OTHER PUBLICATIONS

European Search Report, issued in Application No. 24 15 4513, dated Jul. 8, 2024.

*Primary Examiner* — Christle I Marshall
(74) *Attorney, Agent, or Firm* — Birch, Stewart, Kolasch & Birch, LLP (57) ABSTRACT

A printer including a medium support surface provided with through-holes in connection to a suction chamber assembly, a pressure regulator assembly configured for selectively connecting the through-holes to a suction source or an overpressure source for respectively drawing in gas into or blowing gas from the through-holes and a user interface for user interaction. The pressure regulator assembly is configured to activate one of a plurality of pressure states, and the user interface comprises a user operable digital item provided with a plurality of digital states which one-by-one correspond to the plurality of pressure states of the pressure regulator assembly.

11 Claims, 6 Drawing Sheets

(56) References Cited

U.S. PATENT DOCUMENTS

| | | | |
|---|---|---|---|
| 8,944,588 B2* | 2/2015 | Herrmann | B41J 13/26 347/104 |
| 2005/0225621 A1 | 10/2005 | Ishii et al. | |
| 2009/0202284 A1 | 8/2009 | Shinohara | |
| 2010/0302179 A1 | 12/2010 | Ahn et al. | |
| 2014/0267523 A1 | 9/2014 | Herrmann et al. | |
| 2017/0057255 A1* | 3/2017 | Byrne, III | B41J 11/0085 |
| 2021/0349426 A1 | 11/2021 | Chen et al. | |
| 2021/0394528 A1 | 12/2021 | Hauf et al. | |
| 2024/0001699 A1* | 1/2024 | Osano | B41J 11/0085 |

* cited by examiner

FLATBED PRINTER AND USER INTERFACE WITH PRESSURE REGULATION FOR IN A SUCTION CHAMBER OF THE FLATBED PRINTER

BACKGROUND OF THE INVENTION

1. Field of the Invention

The present invention relates to a printer, a method of printing and a recording medium. If a click action is mentioned hereinafter, the click action also comprises a touch action in case a touch screen is provided as a user interface for the printer.

2. Description of Background Art

Flatbed printers comprise a relatively large vacuum table over which a printhead carriage is movable in both horizontal directions to print images on large or multiple print media held on the table by a negative pressure. Each print medium is generally positioned manually on a medium support surface of the vacuum table.

US2021394528 A1 discloses a printer comprising a medium support surface provided with through-holes in connection to a suction chamber assembly, and a pressure regulator assembly configured for selectively connecting the through-holes to a suction source or an overpressure source for respectively drawing in gas into or blowing gas from the through-holes. The blown gas may act as an air bearing which allows print media to be slid over the medium support surface to position the print media in their intended positions.

When using this functionality the operator or user is often not near a graphical user interface wired or wireless connected to the printer and has no free hands because he is positioning a print media like a rigid on the medium support surface of the vacuum table. Therefore 'Vacuum on/off' is offered by means of a foot pedal and it also has to be possible to turn 'Reverse flow', i.e. overpressure, on and off by means of the foot pedal. However, to be able to use this functionality by means of the graphical user interface is also desired taking into account that the graphical user interface has limited space for additional buttons. Also it has to be taken into account that 'Reverse flow' and 'Vacuum' cannot be turned on at the same time.

A user interface screen for flatbed printing and the operation and effect of the pressure regulator assembly should be kept the same as much as possible when features are added, since the operator or user is used to the way of working with the user operable items which are already present at the printer. Even if the user does not use this functionality of "Reverse Flow", the existing functionality of "Vacuum" should be handled in the same way as before.

The user interface for the printer according to the present invention maybe provided with a screen and a mouse device or may be provide with a touch screen.

SUMMARY OF THE INVENTION

It is an object of the invention to improve the loading and positioning of print media on a flatbed printer for a relatively wide range of print media and to provide a user interface screen that supports the operator or user to do so in an efficient and consistent way.

In accordance with the present invention, a printer according to claim 1 and a method of printing according to claim 9 are provided.

The printer comprises:
- a medium support surface provided with through-holes in connection to a suction chamber assembly,
- a pressure regulator assembly configured for selectively connecting the through-holes to a suction source or an overpressure source for respectively drawing in gas into or blowing gas from the through-holes,
- a user interface screen for user interaction, and
- a user operable tangible module connected to the pressure regulator assembly and configured to regulate a plurality of pressure states of the pressure regulator assembly, characterized in that the user interface screen comprises a user operable digital item provided with a plurality of digital states which one-by-one correspond to the plurality of pressure states of the pressure regulator assembly.

According to an embodiment the pressure regulator assembly is configured to invoke actions to connect or to disconnect toggle-wise the through-holes to the suction source by means of a single tap on the user operable tangible module and to connect or to disconnect toggle-wise the through-holes to the overpressure source by means of a double tap on the user operable tangible module.

According to an embodiment the user operable digital item has a first digital state corresponding to the suction source in an "off" state and the overpressure source in an "off" state, a second digital state corresponding to the suction source in an "on" state and a third digital state corresponding to the overpressure source in an "on" state.

According to an embodiment the user operable digital item is configured to invoke by means of a single click or a double click on the user operable digital item a same action as configured for the pressure regulator assembly by a single tap or a double tap on the user operable tangible module respectively. In case of a user interface provided with a touch screen, according to an alternative embodiment the user operable digital item is configured to invoke by means of a single touch or a double touch on the user operable digital item a same action as configured for the pressure regulator assembly by a single tap or a double tap on the user operable tangible module respectively.

According to an embodiment each of the first, second and third digital states is achievable by the single click or the double click on the user operable digital item from each of the other digital states.

According to an embodiment each of the first, second and third pressure states is achievable by the single tap or the double tap on the user operable tangible module from each of the other pressure states.

According to an embodiment the user interface comprises at least one user operable digital item to regulate the amount of suction or overpressure applied by the suction source or the overpressure source respectively.

According to an embodiment the suction chamber assembly comprises a plurality of separate compartments and each compartment has a dedicated user operable tangible module and a corresponding dedicated user operable digital item on the user interface screen.

The present invention also relates to a method for a printer according to the present invention, wherein the method comprises the steps of selecting one of a plurality of pressure states by means of the user operable tangible module or one of the plurality of digital states by means of the user operable digital item on the user interface, and invoking at least one action to establish the corresponding pressure state.

The present invention also relates to a recording medium comprising computer executable program code configured to instruct a computer connected to a printer according to the present invention to perform the steps of the method according to the present invention.

Further scope of applicability of the present invention will become apparent from the detailed description given hereinafter. However, it should be understood that the detailed description and specific examples, while indicating preferred embodiments of the present invention, are given by way of illustration only, since various changes and modifications within the spirit and scope of the present invention will become apparent to those skilled in the art from this detailed description.

BRIEF DESCRIPTION OF THE DRAWINGS

The present invention will become more fully understood from the detailed description given herein below and the accompanying drawings which are given by way of illustration only, and thus are not limitative of the present invention, and wherein.

DETAILED DESCRIPTION OF THE PREFERRED EMBODIMENTS

The present invention will now be described with reference to the accompanying drawings, wherein the same reference numerals have been used to identify the same or similar elements throughout the several views.

Figure 1:
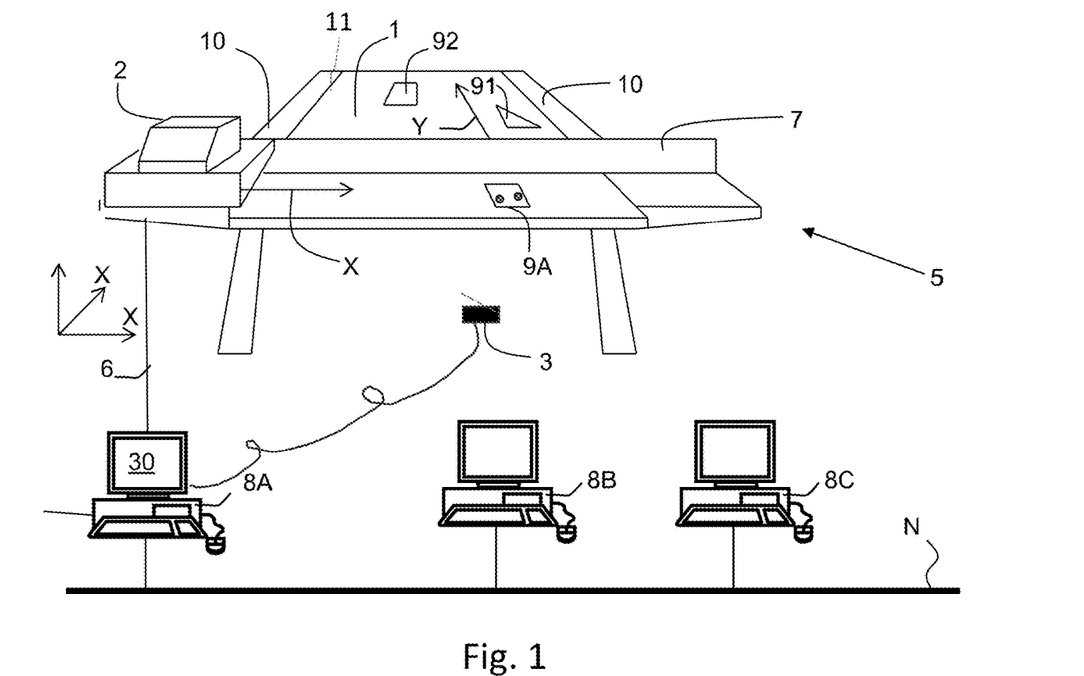
FIG. 1 is a schematic perspective view of a flatbed printer.

FIG. 1 is a printer 5 comprising a number of workstations 8B, 8C, which may be personal computers or other devices for preparing image data for prints to be printed. These workstations have access to a network N for transferring print jobs comprising the image data to a print controller 8A that is configured to receive the print jobs for prints and derive pass images. The print controller 8A may be part of the printer 5 connected to a control unit of the printer 5 via a connection 6. The printer 5 further comprises a print head 2 attached to an armature 7 for applying colorants, for example cyan (C), magenta (M), yellow (Y), black (K) and white (W) colorant, or varnish to pieces 9, 9A of flat print media placed on a flatbed surface 1 in order to obtain a printed image. The armature 7 may comprise a gantry above the flat bed surface 1 as shown in FIG. 1 or a robot arm (not shown) moving in a plurality of directions over the flat bed surface 1. The flatbed surface 1 is the surface of the flatbed which is at least partially printable by the print head 2. The pieces of media may be so small that they are completely placed on the flatbed surface 1, but a piece of media which is larger than the flatbed surface, in which case an image which is going to cover the whole piece of media must be printed into a plurality of parts of the image, is not excluded. A first piece 9A has already been printed 20 upon, while the other pieces 91, 92 are not provided with any recording material yet. The print head 2 reciprocally scans the flatbed surface 1 in the second direction X along a gantry 7 perpendicular to a first direction Y of the gantry 7 over the flatbed surface 1 along guiding parts 10. During printing of an image on the piece 9, 9A of media the piece 91, 92, 9A of media is not moved on the flatbed surface 1. This way of working is advantageous for rigid print media. A print head which is as wide as the flatbed surface may also be envisaged within the scope of the invention. Such a print head may be moveable in at least one direction over the flatbed surface 1. A user operable tangible module 3 according to the invention is connected to the print controller 8A. The user operable tangible module is configured to invoke actions on a pressure chamber 12 shown in FIG. 2. The user operable tangible module 3 may be for example a foot pedal on which an operator or user can tap his foot.

Figure 2:
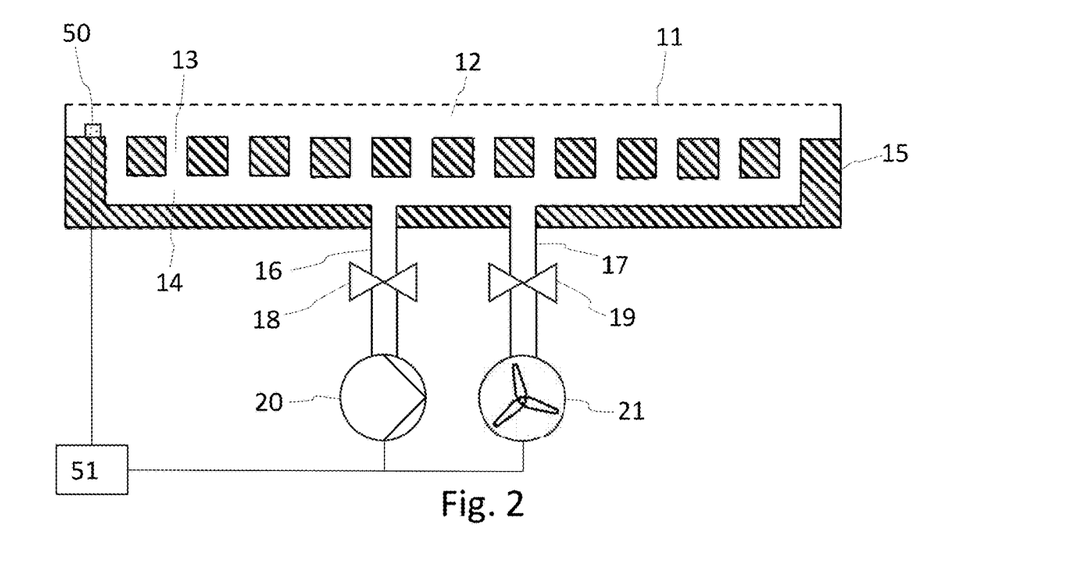
FIG. 2 is a schematic cross-sectional view of a suction chamber assembly of the flatbed printer in FIG. 1.

The flatbed surface 1 comprises a medium support surface 11. The medium support surface 11, as shown in FIG. 2, is provided with through-holes to allow air to pass through the medium support surface 11. A pressure chamber 12 is provided below medium support surface 11 as part of a suction chamber assembly 15. By applying a negative pressure in the pressure chamber 12, print media can be securely and flatly held against the medium support surface 11. A suction source 20 is provided to form the negative pressure in the pressure chamber 12. Fans or pumps etc. may be applied as suction source 20. The suction source 20 is connected to a manifold 13 positioned below the pressure chamber 12. The pressure chamber 12 is preferably relatively narrow in the vertical direction Z, with as a practical result that the air flow resistance in horizontal directions X, Y in the pressure chamber 12 is relatively large. The manifold 13 comprises a large plurality of parallel channels with a relatively large diameter to provide a low air resistance connection to the suction source 20. The vertical channels are provided in a relatively high and constant density, so that each through-hole in the medium support surface 11 is relatively near or adjacent to a channel. For example, no more than five to ten through-holes are positioned between each through-hole and its nearest channel. This allows the negative pressure to be maintained effectively at each through-hole. The manifold 13 on its bottom side is connect to a large flow chamber 14, which connects to the suction source 20 via the suction line 16. A pressure regulator 18 in the form of a valve is provided in the suction line 16 to adjust the negative pressure. Alternatively, the negative pressure may be regulated by controlling the suction source 20, e.g. by adjusting its speed. The negative pressure is applied to hold print media securely onto the medium support surface 11 during printing.

Similarly, an overpressure source 21 is provided in connection to the flow chamber 14 via the overpressure line 17. The overpressure source 21 may also be a pump or fan. The overpressure may be regulated by means of the pressure regulator 19, which comprise a valve for at least partially opening and closing the overpressure line 17. The pressure regulators 18, 19 are preferably controlled, so that one of the suction line 16 and the overpressure line 17 is closed, when respectively a negative pressure or overpressure is applied via the other line 16, 17. Due to the relatively low air resistance of the manifold 13, the overpressure can be effectively applied to each through-hole via the pressure chamber 12. In consequence, air is blown out from the through-holes. This results in an air bearing, which can support a print medium, so that it floats or hovers just above the medium support surface 11. Since the print medium is above the medium support surface 11 on the air bearing, it can be relatively easily moved in the horizontal directions X, Y. This reduces the effort required for loading and positioning print media on the medium support surface 11.

The pressure chamber 12 further comprises at least one pressure sensor 50 configured to determine the pressure in the pressure chamber 12. The pressure sensor 50 may directly or indirectly detect the pressure in the pressure chamber 12. Suitable pressure sensors, such as manometers, strain gauges, capacitive or piezoelectric sensors, etc. may be applied. The pressure sensor 50 transmits a pressure signal to the controller 51, which applies this pressure signal to control the suction source 20 and/or the overpressure source 21 and/or the assembly of pressure regulators 18, 19. The controller 51 compares the pressure signal to set or selected pressure setting. The controller 51 comprises a pressure regulating algorithm, for example a feedback loop, to maintain the pressure in the suction chamber 12 at or near the pressure setting. The controller 51 e.g. may comprise for example a PID controller configured to maintain the pressure at or near the pressure setting. Different controllers or algorithms may be applied for respectively the suction source 20 and the overpressure source 21. The user operable tangible module 3 shown in FIG. 1 is wired or wireless connected to controller 51.

Figure 3:
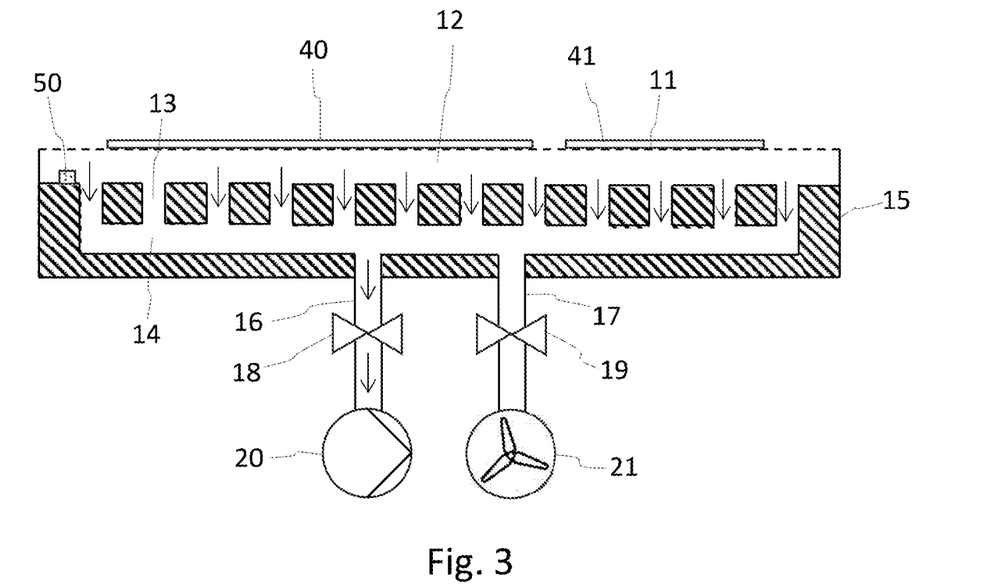
FIG. 3 is a schematic cross-sectional view of the suction chamber assembly in FIG. 2 in a printing mode of the flatbed printer in FIG. 1.
Figure 7:
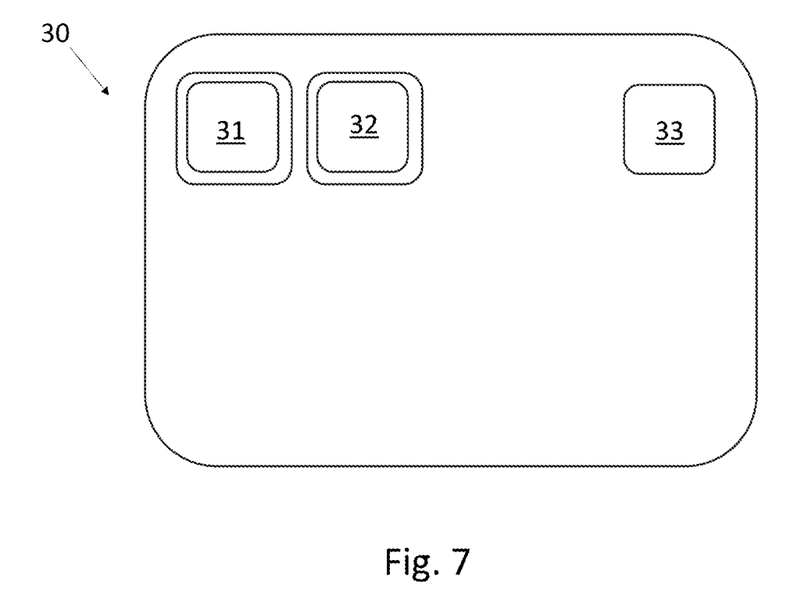
FIGS. 7-8 are schematic representations of a user interface of the printer in FIG. 1.
Figure 8:
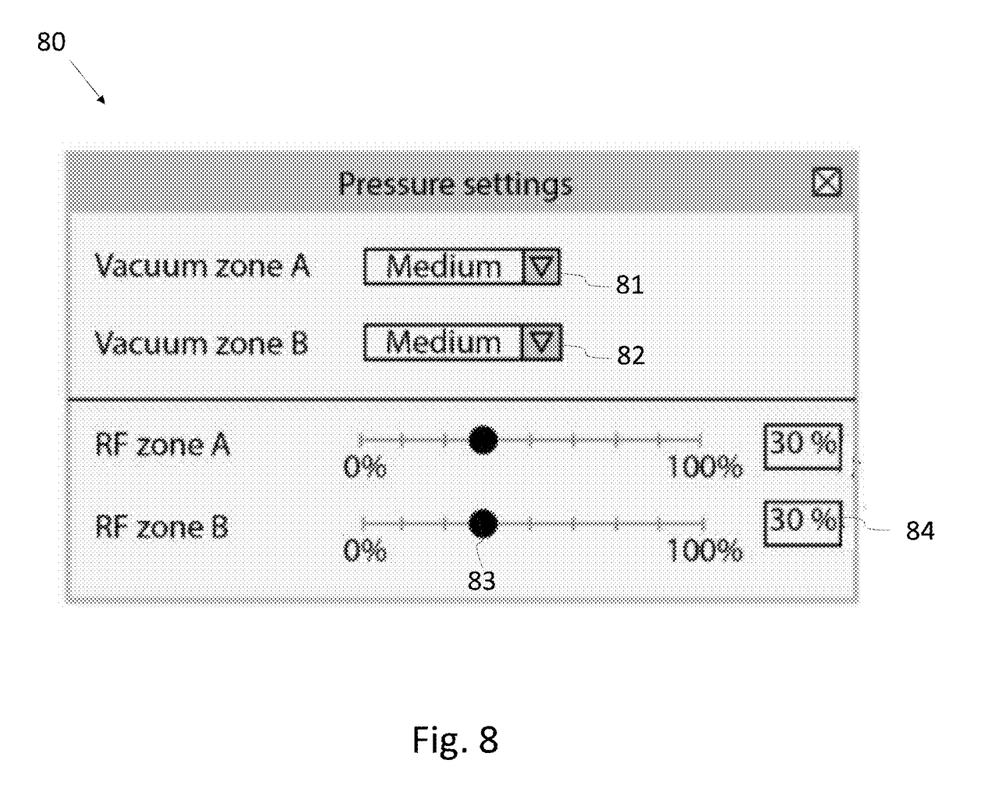

FIG. 3 illustrates the controller 51 being set to operate in a medium holding mode. In the medium holding mode, the controller 51 controls the suction source 20 and the pressure regulators 18, 19, so that a negative pressure is applied to the pressure chamber 12. Air is then drawn in via the through-holes in the medium support surface 11, as indicated by the arrows. The print media 40, 41 are sucked against the medium support surface 11 and are securely held in place due to the frictional forces between the print media 40, 41 and the medium support surface 11. In FIG. 3, the suction source 20 is active and the pressure regulator 18 is open to connect the suction source 20 to the pressure chamber 12. The overpressure source 21 may be de-activated and the other pressure regulator 19 closes the overpressure line 17. The medium holding mode is applied during printing, wherein the carriage 2 and the gantry 7 move over the medium support surface 11. The controller 51 may be set to the a first medium holding mode via the user interface 30 by means of a first user operable digital item 31 and a third user operable digital item 33 as shown in FIG. 7. The first user operable digital item 31 is e.g. a button on the user interface 30 that activates the medium holding mode ("vacuum") or the medium overpressure mode ("reverse flow"). The third user operable digital item 33 is e.g. a button on the user interface 30 that opens a pressure settings window 80 for pressure setting as shown in FIG. 8. The operator may for example press the user operable digital item 31 after all print media haven loaded and positioned. In the example in FIG. 7, the medium holding mode defines a single pressure setting, which the controller 41 uses to regulate the pressure in the pressure chamber 12. The pressure is measured by the pressure sensor 50 and regulated by the controller 51 via a medium holding mode pressure regulating algorithm based on said measurement. The medium holding mode may also be automatically entered when the controller starts a print job. It will be appreciated that dependent on the number and/or type of print media, different negative pressure settings may be applied via the controller 51.

Figure 4:
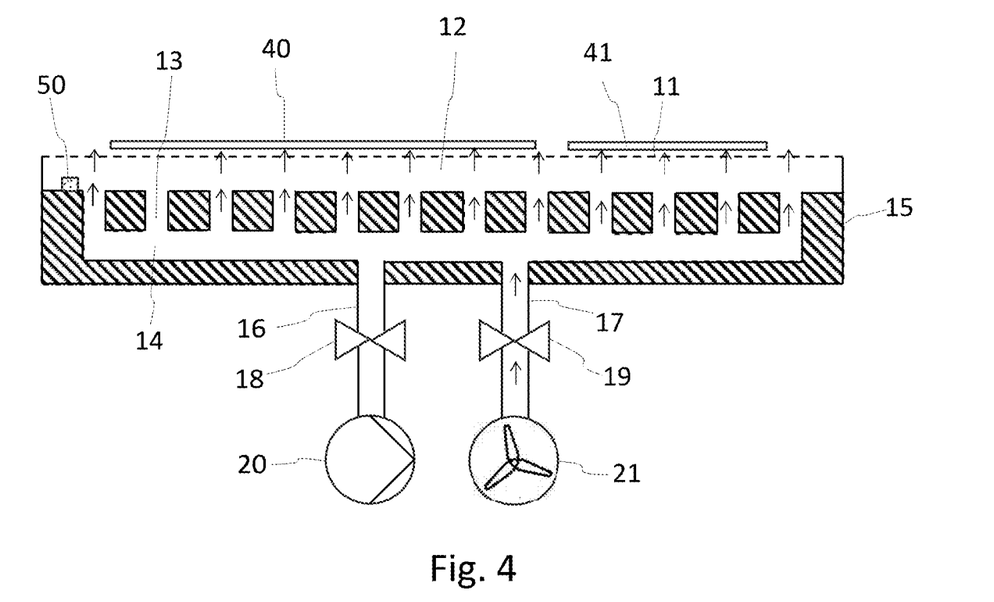
FIG. 4 is a schematic cross-sectional view of the suction chamber assembly in FIG. 2 in a medium loading mode at a first pressure setting of the flatbed printer in FIG. 1.

FIG. 4 illustrates the controller 51 being set to operate in a first medium loading mode for relatively light print media 40, 41, like paper, foil, or sheets. In this mode, the suction source 20 and its corresponding pressure regulator 18 are prevented from applying a pressure in the pressure chamber 12, for example by closing the suction line 16. The overpressure source 21 has been activated by the controller 51 and the pressure regulator 19 is controlled based on the pressure sensor 50 to maintain the pressure in the pressure chamber 12 at the level corresponding to a first overpressure setting. The first medium loading mode is selected via the user interface 30 by means of the first user operable digital item 31, illustrated as a button in FIG. 7. Selecting the first medium loading mode comprising setting a first overpressure setting. In this example, the first overpressure setting is stored on the controller's memory and automatically selected and set, when the first medium loading mode is activated. The controller 51 controls the pressure regulator 19, so that the overpressure source 19 applies a first negative pressure in the pressure chamber 12 corresponding to the first overpressure setting. The resulting air flow is relatively small as indicated by the arrows, but sufficiently great to lift and maintain the print media 40, 41 a short distance away from the medium support surface 11. Since the pressure regulator 17 actively maintains the pressure in the pressure chamber 12 at or near the intended first negative pressure, the pressure in the pressure chamber 12 is relatively constant. This prevents the print media 40, 41 from floating over and off the medium support surface 11. This allows an operator to release one print medium 40, 41, so that it remains substantially in place. Thus, the operator can position multiple print media 40, 41 on the medium support surface 11 in this manner.

Figure 5:
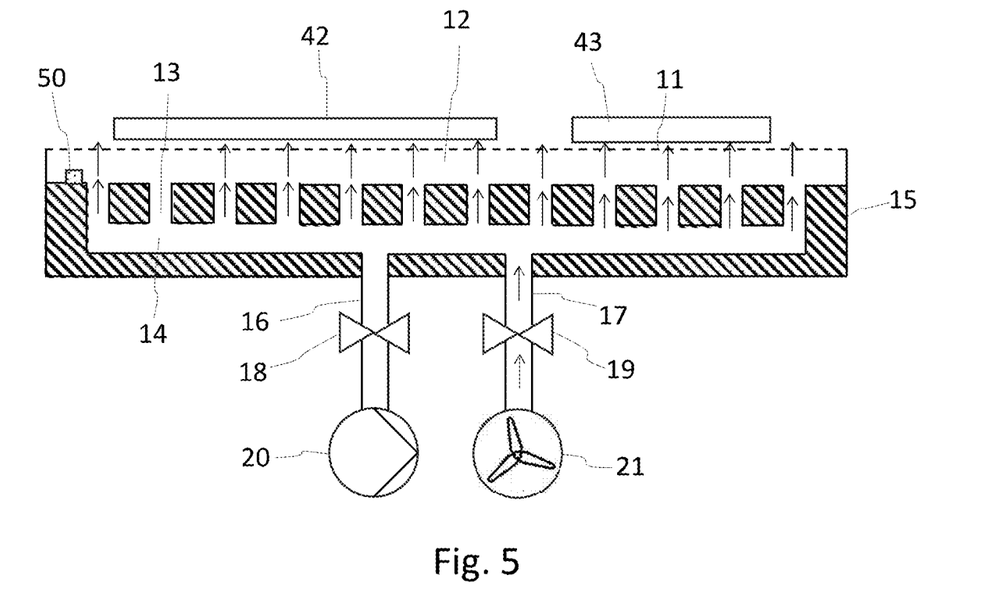
FIG. 5 is a schematic cross-sectional view of the suction chamber assembly in FIG. 2 in a medium loading mode at a second pressure setting of the flatbed printer in FIG. 1.

FIG. 5 illustrates the loading of print media 42, 43 of moderate weight, for example cardboard. The first overpressure setting is insufficient to lift these print media 42, 43 from the medium support surface 11. A second overpressure setting is then selected by choosing the second medium loading mode via the third user operable digital item 33 on the user interface 30. By selecting the first user operable digital item 31, the controller 51 retrieves the second overpressure setting from its memory and applies this in its overpressure regulating algorithm, so that the pressure in the pressure chamber 12 is maintained at or near a second negative pressure, corresponding to the second overpressure setting. As shown by the arrows in FIG. 5, the air flow here is relatively moderate and greater than that in FIG. 4. In consequence, the cardboard substrates 42, 43 are lifted from the medium support surface 11, but without substantially displacing these in the horizontal direction (unless being moved by the operator or another external force).

Figure 6:
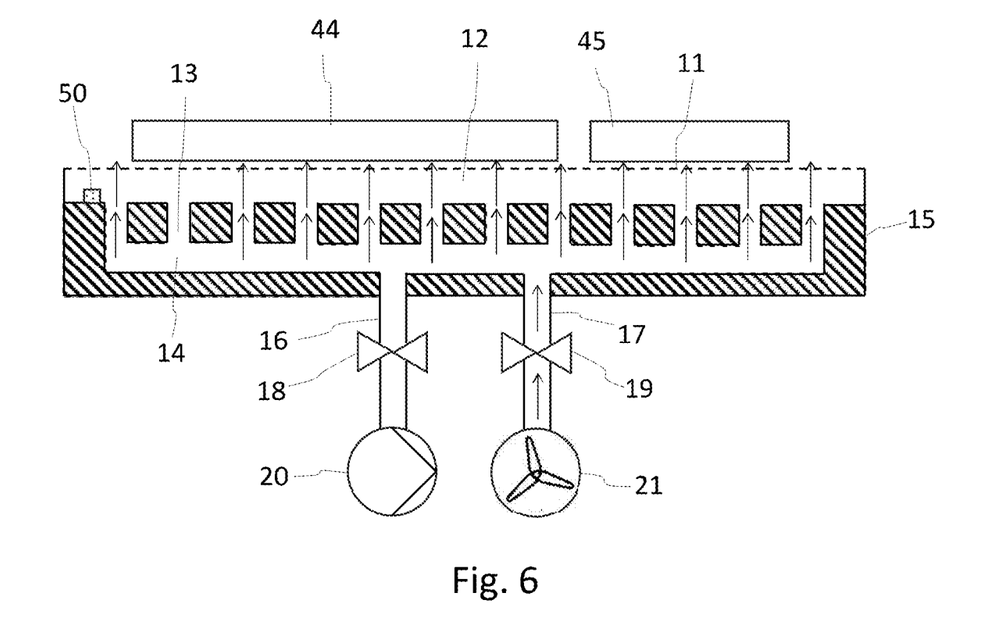
FIG. 6 is a schematic cross-sectional view of the suction chamber assembly in FIG. 2 in a medium loading mode at a third pressure setting of the flatbed printer in FIG. 1.

FIG. 6 illustrates the loading of relatively heavy print media 44, 45, for example in the form of wooden panels. As the first and second overpressure settings are insufficient, the third medium loading mode is selected by pressing the third user operable digital item 33 which leads to the pressure setting window 80 for activating the third medium loading mode. This sets the controller 51 to apply a third pressure setting, which results in a negative pressure further removed from ambient pressure as compared to when the first and second pressure settings are applied. This results in the relatively large air flows, indicated by the arrows, which air flow is sufficient to lift the wooden panels from the medium support surface 11. Thus, a single operator is then able to position such heavy print media 44, 45.

FIG. 7 illustrates the user interface 30 shown in FIG. 1 in more detail. The user interface 30 is provided with the user operable digital items 31-33.

It will be appreciated that alternatively, the user interface 30 may allow the operator to directly set a pressure setting, for example via inputting a numeric value or an adjustable slider on the user interface 30. In another embodiment, the controller 51 selects the appropriate pressure setting from information in the uploaded print job. The user interface 30 comprises the user operable digital items 31, 32 according to the present invention in order to easily and consistently switch between a vacuum mode, i.e. the medium holding mode, a reverse flow mode i.e. a medium loading mode, and a standby mode.

In case of more than one vacuum compartment, i.e. vacuum zone, beneath the print surface of the printer 5, a user operable digital item is provided on the user interface 30 for each vacuum zone.

In this example, there are two vacuum zones, a first vacuum zone A and a second vacuum zone B. The first user operable digital item 31 corresponds to the first vacuum zone A. The second user operable digital item 32 corresponds to the second vacuum zone B.

The user operable digital items 31, 32, for example a button, are configured to invoke actions due to a single or double click on the user operable digital items 31, 32 as indicated by the doubled rectangles representing the buttons 31, 32 in FIG. 7. A single click on the user operable digital item 31, 32 corresponds to a single tap on the user operable tangible module 3. A double click on the user operable digital item 31, 32 corresponds to a double tap on the user operable tangible module 3.

By means of the user interface screen 30 the operator or user is able to directly put the printer in each of the pressure states. An advantage is that the usage of the button 31, 32 on the user interface screen 30 corresponds exactly with the user operable tangible module 3 shown in FIG. 1. Another advantage is that a user who thinks that he has to turn the vacuum off before turning the reverse flow on or vice versa can also do these actions in that way, but off course by following the three state diagram it can be done in a more productive way.

The user operable digital item 33 is suitable for opening a pressure settings window 80 shown in FIG. 8.

FIG. 8 illustrates the pressure settings window 80. For each vacuum zone A, B an amount of suction (vacuum) or reverse flow (overpressure) can be set to a low, medium and high level by means of a drop down selection list 81, 82. The low, medium and high level may be used for reverse flow of a print medium with a low, medium and high weight respectively. The pressure can be set for each zone A, B separately by using either the slider 83 or the entry field 84. When setting the pressure using the slider 83, the exact value is reflected in the entry field 84. In case the pressure is set using the entry field 84, the slider 83 goes to the corresponding exact location.

Figure 9:
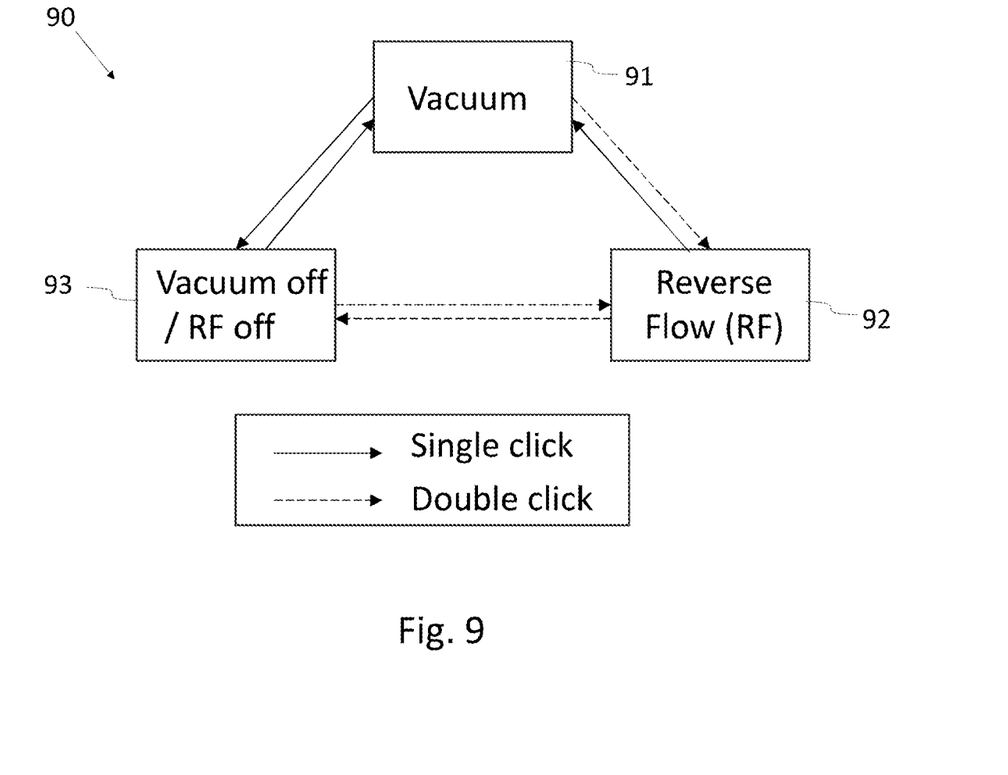
FIG. 9 is a schematic diagram of the pressure states of the pressure regulator assembly of the printer in FIG. 1.

FIG. 9 is a three state diagram 90 of the three states for a vacuum zone according to the present invention. A first state 91 is labeled "Vacuum". A second state 92 is labeled "Reverse Flow (RF)". A third state 93 is the "off" mode wherein both the vacuum mode and the reverse flow mode are switched off. In order to switch between different states the two three state buttons 31, 32 as show in FIG. 7—one button for each vacuum zone A, B—are present at the top of the user interface 30. A three state button is advantageous since it occupies less space than separate buttons. The behavior of the buttons 31, 32 is made consistent with the behavior of the user operable tangible module 3 shown in FIG. 1, for example a foot pedal. Single clicking on the button 31, 32 is related to a first state 91 labeled "Vacuum". Double clicking on the button 31, 32 is related to a second state 92 labeled "Reverse Flow (RF)". A third state 93 is the stand-by mode wherein both the vacuum mode and the reverse flow mode are switched off. For example, when the operator wants to switch from the second state 92 to the first state 91, the button 31, 32 should be clicked once and to return to third state 93 again a single click is necessary. To switch from the first state 91 to the second state 92 a double click is necessary and a single click when switching from the second state 92 to the first state 91. To switch from the second state 92 to the third state 93 a double click is needed. In an embodiment the icon of the button 31, 32 and/or the color of the button 31, 32 will change in order to indicate the actual pressure state.

Figure 10:
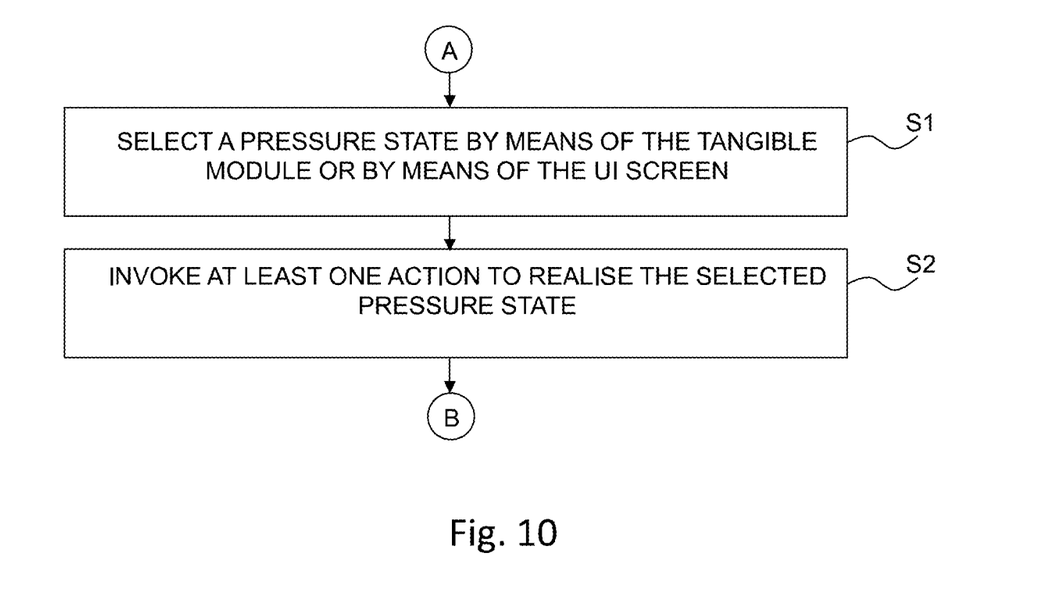
FIG. 10 is a schematic diagram of the method according to the present invention.

FIG. 10 is a flow diagram of the method for a printer according to the invention.

The method starts in a starting point A which leads to a first step S1.

In the first step S1 one of a plurality of pressure states is selected by means of the user operable tangible module or one of the plurality of digital states by means of the user operable digital item on the user interface.

In a second step S2 the print controller 51 invokes at least one action described hereinbefore in order to establish the corresponding pressure state.

The method ends in an end point B.

Figure 11:
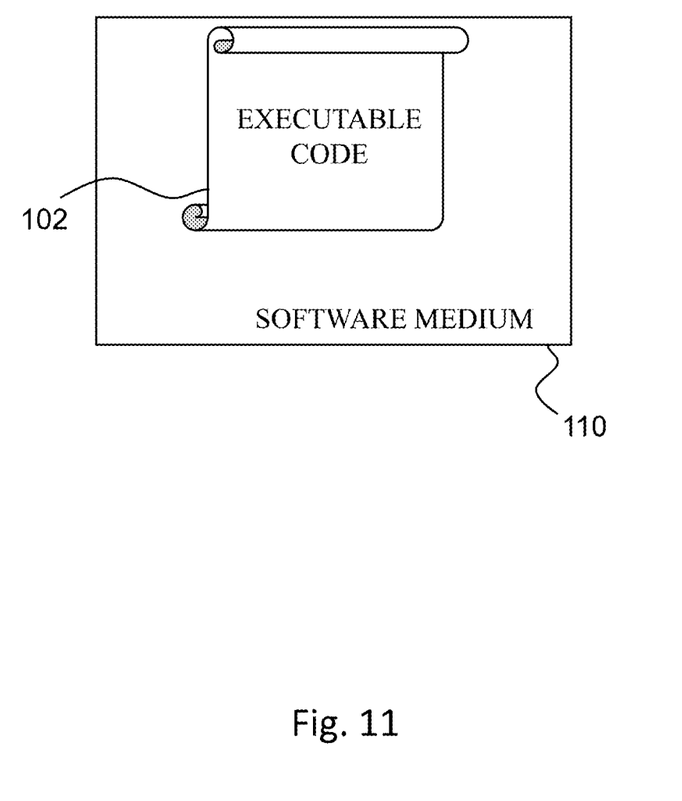
FIG. 11 is a schematic drawing of the recording medium according to the present invention.

FIG. 11 schematically shows a non-transitory software medium 110 according to the invention. The software medium 110 comprises executable code 102 configured to, when executed, perform the method according to the invention, e.g. as described with respect to either the printer shown in FIG. 1, the user interface shown in FIG. 7 or the method shown in FIG. 10 and/or according to any of the variants and modifications of the printer and/or of the method described hereinbefore.

The non-transitory software medium 110 may, specifically, be formed as a CD or a CD-ROM, a DVD or a DVD-ROM, a BluRay disc or a BluRay-ROM disc, a magnetic hard drive, a solid state disk (SSD) hard drive, a USB memory device and so on.

The skilled person will recognise that other embodiments are possible within the scope of the appended claims.

Although specific embodiments of the invention are illustrated and described herein, it will be appreciated by those of ordinary skill in the art that a variety of alternate and/or equivalent implementations exist. It should be appreciated that the exemplary embodiment or exemplary embodiments are examples only and are not intended to limit the scope, applicability, or configuration in any way. Rather, the foregoing summary and detailed description will provide those skilled in the art with a convenient road map for implementing at least one exemplary embodiment, it being understood that various changes may be made in the function and arrangement of elements described in an exemplary embodiment without departing from the scope as set forth in the appended claims and their legal equivalents. Generally, this application is intended to cover any adaptations or variations of the specific embodiments discussed herein.

It will also be appreciated that in this document the terms "comprise", "comprising", "include", "including", "contain", "containing", "have", "having", and any variations thereof, are intended to be understood in an inclusive (i.e. non-exclusive) sense, such that the process, method, device, apparatus or system described herein is not limited to those features or parts or elements or steps recited but may include other elements, features, parts or steps not expressly listed or inherent to such process, method, article, or apparatus. Furthermore, the terms "a" and "an" used herein are intended to be understood as meaning one or more unless explicitly stated otherwise. Moreover, the terms "first", "second", "third", etc. are used merely as labels, and are not intended to impose numerical requirements on or to establish a certain ranking of importance of their objects.

The present invention being thus described, it will be obvious that the same may be varied in many ways. Such variations are not to be regarded as a departure from the spirit and scope of the present invention, and all such modifications as would be obvious to one skilled in the art are intended to be included within the scope of the following claims.

The invention claimed is:

1. A printer comprising:
   a medium support surface provided with through-holes in connection to a suction chamber assembly,
   a pressure regulator assembly configured for selectively connecting the through-holes to a suction source or an overpressure source for respectively drawing in gas into or blowing gas from the through-holes,
   a user interface screen for user interaction, and
   a user operable tangible module connected to the pressure regulator assembly and configured to regulate a plurality of pressure states of the pressure regulator assembly,
   wherein the user interface screen comprises a user operable digital item provided with a plurality of digital states which one-by-one correspond to the plurality of pressure states of the pressure regulator assembly.

2. The printer according to claim 1, wherein the pressure regulator assembly is configured to invoke actions to connect or to disconnect toggle-wise the through-holes to the suction source by means of a single tap on the user operable tangible module and to connect or to disconnect toggle-wise the through-holes to the overpressure source by means of a double tap on the user operable tangible module.

3. The printer according to claim 2, wherein the user operable digital item has a first digital state corresponding to the suction source in an "off" state and the overpressure source in an "off" state, a second digital state corresponding to the suction source in an "on" state and a third digital state corresponding to the overpressure source in an "on" state.

4. The printer according to claim 2, wherein the user operable digital item is configured to invoke by means of a single click or a double click on the user operable digital item a same action as configured for the pressure regulator assembly by a single tap or a double tap on the user operable tangible module respectively or to invoke by means of a single touch or a double touch on the user operable digital item a same action as configured for the pressure regulator assembly by a single tap or a double tap on the user operable tangible module respectively.

5. The printer according to claim 3, wherein each of the first, second and third digital states is achievable by the single click or the double click on the user operable digital item from each of the other digital states or, in case of a touch user interface screen, each of the first, second and third digital states is achievable by the single touch or the double touch on the user operable digital item from each of the other digital states.

6. The printer according to claim 3, wherein each of the first, second and third pressure states is achievable by the single tap or the double tap on the user operable tangible module from each of the other pressure states.

7. The printer according to claim 1, wherein the user interface comprises at least one user operable digital item to regulate the amount of suction or overpressure applied by the suction source or the overpressure source respectively.

8. The printer according to claim 1, wherein the suction chamber assembly comprises a plurality of separate compartments and each compartment has a dedicated user operable tangible module and a corresponding dedicated user operable digital item on the user interface screen.

9. A method for the printer according to claim 1, wherein the method comprises the steps of selecting one of a plurality of pressure states by means of the user operable tangible module or one of the plurality of digital states by means of the user operable digital item on the user interface, and invoking at least one action to establish the corresponding pressure state.

10. A non-transitory recording medium comprising computer executable program code configured to instruct a computer connected to a printer to perform the steps of the method according to claim 9.

11. The printer according to claim 1, wherein the user operable tangible module comprises a foot pedal.

* * * * *